United States Patent [19]

Gerst et al.

[11] Patent Number: 5,097,712

[45] Date of Patent: Mar. 24, 1992

[54] DIFFERENTIAL PRESSURE MEASURING APPARATUS

[75] Inventors: Peter Gerst, Karlsruhe; Wulf Springhart, Böllen, both of Fed. Rep. of Germany

[73] Assignee: Endress u. Hauser GmbH u. Co., Fed. Rep. of Germany

[21] Appl. No.: 719,674

[22] Filed: Jun. 24, 1991

Related U.S. Application Data

[63] Continuation of Ser. No. 588,701, Sep. 27, 1990, abandoned.

[30] Foreign Application Priority Data

Sep. 28, 1989 [DE] Fed. Rep. of Germany ...... 3932443

[51] Int. Cl.⁵ .............................................. G01L 19/04
[52] U.S. Cl. ...................................... 73/708; 73/718; 361/283; 374/143
[58] Field of Search ............... 73/708, 718, 724, 706; 361/283; 374/143

[56] References Cited

U.S. PATENT DOCUMENTS

| | | | |
|---|---|---|---|
| 3,355,949 | 12/1967 | Elwood et al. | 374/143 |
| 3,646,538 | 2/1972 | Frick | 340/200 |
| 3,715,638 | 2/1973 | Polye | 317/247 |
| 3,783,374 | 1/1974 | Eide et al. | 324/60 C |
| 4,072,057 | 2/1978 | Yasuhara et al. | 73/718 |
| 4,169,389 | 10/1979 | Yasuhara et al. | 73/718 |
| 4,177,496 | 12/1979 | Bell et al. | 361/283 |
| 4,398,194 | 8/1983 | Johnston | 340/870.37 |
| 4,531,415 | 7/1985 | Orlowski et al. | 73/718 |
| 4,598,381 | 7/1986 | Cucci | 73/708 |
| 4,680,971 | 7/1987 | Kavli et al. | 73/718 |
| 4,735,098 | 4/1988 | Kavli et al. | 73/718 |
| 4,866,640 | 9/1989 | Morrison, Jr. | 73/708 |
| 4,872,349 | 10/1989 | Espiritu-Santo | 73/708 |

FOREIGN PATENT DOCUMENTS

| | | |
|---|---|---|
| 2052520 | 4/1971 | Fed. Rep. of Germany . |
| 2021479 | 11/1971 | Fed. Rep. of Germany . |
| 2221062 | 11/1972 | Fed. Rep. of Germany . |
| 2364027 | 7/1975 | Fed. Rep. of Germany . |
| 2709945 | 9/1977 | Fed. Rep. of Germany . |
| 3238430 | 4/1984 | Fed. Rep. of Germany . |
| 3321580 | 12/1984 | Fed. Rep. of Germany . |
| 3340834 | 5/1985 | Fed. Rep. of Germany . |
| 3414896 | 10/1985 | Fed. Rep. of Germany . |
| 3504329 | 8/1986 | Fed. Rep. of Germany . |
| 3705321 | 9/1988 | Fed. Rep. of Germany . |
| 3827138 | 2/1989 | Fed. Rep. of Germany . |
| 3839864 | 6/1989 | Fed. Rep. of Germany . |
| WO85/04474 | 10/1985 | PCT Int'l Appl. . |

OTHER PUBLICATIONS

V. Graeger et al., "Keramischer Differenzdrucksensor in Dick-schichttechnik", Automatisierungstechnische Praxis atp., 27. Jrg., Heft 10, 1985, pp. 476–481.

Primary Examiner—Donald O. Woodiel
Attorney, Agent, or Firm—Barnes & Thornburg

[57] ABSTRACT

The differential pressure measuring apparatus comprises a single chamber differential pressure sensor filled with a fluid and having two measuring capacitors whose capacitances vary in opposite senses in response to the differential pressure to be measured and in the same sense in response to the temperature said capacitances being transformed by means of associated capacitance measuring circuits into measurement signals which are supplied to a calculation circuit for calculating the temperature and the differential pressure. A temperature measuring means which comprises a temperature sensor mounted on the differential pressure sensor and a temperature measuring circuit connected to the temperature sensor measures directly the temperature of the single chamber differential pressure sensor. A comparison means compares the temperature calculated from the capacitances of the measuring capacitors with the measured temperature and delivers a signal indicating the occurrence of a failure when the difference between the compared temperatures exceeds a predetermined threshold. By this self-monitoring, perturbations and other causes of failure which would result in an erroneous measurement can be recognized and indicated with great safety.

2 Claims, 1 Drawing Sheet

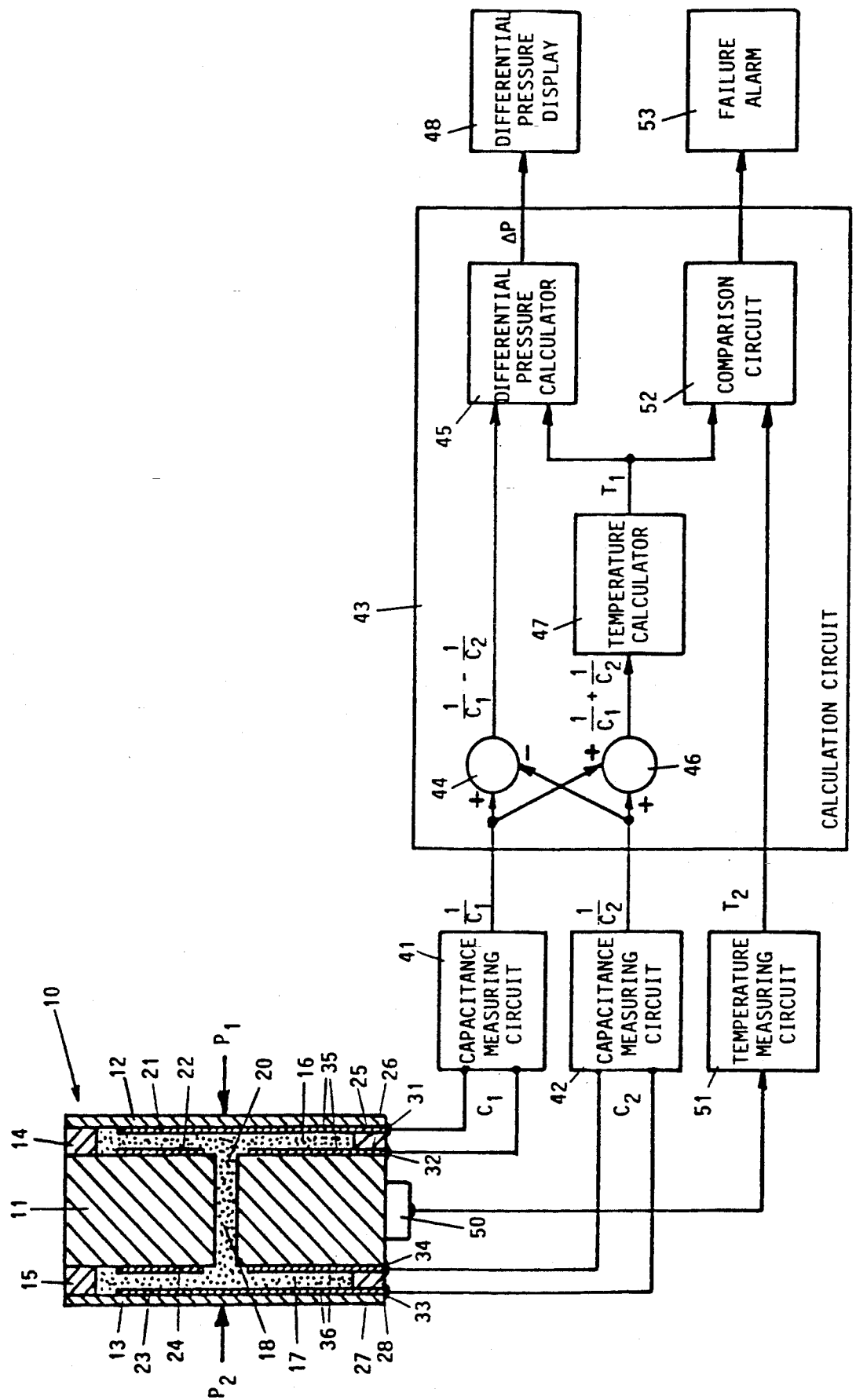

DIFFERENTIAL PRESSURE MEASURING APPARATUS

This application is a continuation of application Ser. No. 588,701, filed Sept. 27, 1990, now abandoned.

The present invention relates to differential a pressure measuring apparatus comprising a single chamber differential pressure sensor filled with a fluid and having two measuring capacitors whose capacitances vary in opposite senses in response to the differential pressure to be measured and in the same sense in response to the temperature, said capacitances being transformed by means of associated capacitance measuring circuits into measurement signals which are supplied to a calculation circuit for calculating the temperature and the differential pressure.

A differential pressure measuring apparatus of this kind is known from German Patent 35 04 329. The single chamber differential pressure sensor consists of a cylindrical base body with two diaphragms, each mounted at an end of the base body and defining a cavity. The measuring capacitors are defined by film electrodes, which are applied on the faces of the base body and of the diaphragms which lie opposite to each other. The two cavities communicate with each other via a passage provided in the base body, and the entire volume of the thus defined common chamber is filled with an incompressible fluid. When the pressures acting upon the two diaphragms have different values, the two diaphragms are displaced in the same direction as a result of the coupling through the fluid such that one of the diaphragms comes closer to the base body while the other diaphragm moves farther away from the base body. As a consequence, the capacitances of the measuring capacitors vary in opposite senses as a function of the differential pressure and the differential pressure is approximatively proportional to the difference between the reciprocals of the capacitance values. In contrast, when the volume of the fluid varies as a consequence of a temperature variation, the two diaphragms are displaced in opposite directions, such that they simultaneously come closer to the base body or move farther away from the latter. Accordingly, the capacitances of the measuring capacitors vary in the same sense as a function of the temperature and the temperature is approximatively proportional to the sum of the reciprocals of the capacitance values. The calculation circuit calculates the temperature from the sum of the reciprocals of the capacitance values and uses the result to make a correction of the temperature dependence of the differential pressure calculated from the difference between the reciprocals of the capacitance values.

Admittedly, this known differential pressure measuring apparatus permits to obtain a measured value for the differential pressure which is independent of the temperature variations, but it does not permit to detect perturbations or other causes of failure which lead to an erroneous result. Causes of non-detectable failures are for example a loss of fluid caused by a lack of tightness, modifications of the diaphragm properties as a result of damages or wear etc.

An object of the invention is to provide a differential pressure measuring apparatus of the kind specified at the beginning wherein perturbations and other causes of failure, which would lead to an erroneous result, are detected and indicated with a high safety by means of a self-monitoring.

In order to achieve this object, the differential pressure measuring apparatus according to the invention comprises a temperature measuring means for measuring directly the temperature of the single chamber differential pressure sensor and a comparison means for comparing the temperature calculated from the capacitances of the measuring capacitors with the measured temperature and for delivering a signal indicating the occurrence of a failure when the difference between the compared temperatures exceeds a predetermined threshold.

In the differential pressure measuring apparatus according to the invention all perturbations and causes of failure which would lead to an erroneous measurement of capacitance also result in a difference between the temperature calculated from the capacitance values and the directly measured temperature. Therefore, the presence of a measuring error will be safely detected and indicated even when the calculated differential pressure and the calculated temperature are still quite plausible. Obviously, defects which result in a complete breakdown of the measurement, such as cable cuts, deficiencies in the capacitance measurement circuits or similar, will immediately be detected and indicated, too. Further, the proper operation of the added temperature sensing means is kept under survey since any deficiency thereof leads to a difference between the measured temperature and the temperature calculated from the capacitance values. A complete self-monitoring of the differential pressure measuring apparatus is therefore achieved with a great inherent safety.

Preferably, the temperature measuring means comprise a temperature sensor mounted onto the differential pressure sensor and a temperature measuring circuit connected to the temperature sensor.

Other features and advantages of the invention will appear from the ensuing description of an embodiment schematically illustrated in the sole FIGURE of the drawings.

The differential pressure measuring apparatus illustrated in the drawing comprises a single chamber differential pressure sensor 10 and an evaluation circuit. The single chamber differential pressure sensor 10 has a cylindrical base body 11 and two resilient diaphragms 12 and 13 which are mounted in a pressure-tight manner at either end faces of the base body by means of inserted, circumferentially extending spacing rings 14 and 15, respectively. The base body 11 and the diaphragms 12,13 are made of an electrically insulating material, preferably a metal oxide ceramic. The spacing rings 14 and 15 are also preferably made of an electrically insulating material which ensures the pressure-tight connection between the base body 11 and the diaphragms 12 and 13, for example glass frit. The spacing rings 14, 15 maintain the diaphragms 12, 13 spaced from the base body 11, such that a generally flat cavity 16 and 17, respectively is formed between each diaphragm 12, 13 and the opposite face of the base body. The two cavities 16, 17 communicate with each other via an axial passage 18 provided in the base body 11, to thereby form a common chamber which is tightly sealed from the exterior. The entire volume of the chamber is filled with an incompressible insulating fluid 20, for example silicone oil.

The inner face of the diaphragm 12 which faces the base body 11 is coated with a film electrode 21 which faces an annular film electrode 22 provided on the opposite end face of the base body 11. In the same manner, the inner face of the diaphragm 13 is coated with a film electrode 23 which faces an annular film electrode 24 provided on the opposite end face of the base body 11. The film electrodes 21, 22, 23, 24 are connected via connecting conductors 25, 26, 27, 28 to terminals 31, 32, 33, 34 accessible from the exterior. In the illustrated example, the connecting conductors 25 to 28 are film conducting strips which are applied jointly with the corresponding film electrodes 21 to 24 and extend to the exterior between the spacing rings 14, 15 and the base body 11. For example, the film electrodes 21 to 24 and the film conducting strips 25 to 28 could be applied by thick film technology.

The film electrode 21 and the opposite film electrode 22 form a first measuring capacitor 35 whose capacitance $C_1$ can be measured between the terminals 31 and 32, and the film electrode 23 and its opposite film electrode 24 form a second measuring capacitor 36 whose capacitance $C_2$ can be measured between the terminals 33 and 34.

The pressure acting upon the diaphragm 12 is designated by $P_1$ and the pressure acting upon the diaphragm 13 is designated by $P_2$. When both pressures $P_1$ and $P_2$ are equal, such that the differential pressure $$\Delta P = P_1 - P_2$$

is zero, the differential pressure sensor 10 assumes the balanced position illustrated, in which the capacitances $C_1$ and $C_2$ of the two measuring capacitors 35, 36 are equal, assuming that the assembly is totally symmetrical without any manufacturing tolerances. Owing to the incompressible fluid 20, which fills the entire volume between the two diaphragms 12 and 13, the diaphragms cannot actually be displaced under the action of the pressures $P_1$ and $P_2$ when these pressures are equal. However, when for example pressure $P_1$ is higher than pressure $P_2$, it can displace diaphragm 12 towards the base body 11 and a portion of the incompressible fluid 20 is transferred from the cavity 16 to the cavity 17 via the passage 18, such that the diaphragm 13 is displaced away from the base body 11 towards the exterior against the pressure $P_2$. As a result of the displacements of the two diaphragms 12 and 13, the distance between the film electrodes 21 and 22 is reduced and the distance between the film electrodes 23 and 24 is increased. Correspondingly, the capacitance $C_1$ is increased and the capacitance $C_2$ is decreased. The pressure differential $\Delta P$ can hence be determined by measurement of the two capacitances $C_1$ and $C_2$. Neglecting the non-linearity and the influence of perturbation quantities the differential pressure is approximatively proportional to the difference between the reciprocals of the capacitances:

$$\Delta P = k_P \cdot \left( \frac{1}{C_1} - \frac{1}{C_2} \right) \tag{1}$$

A significant perturbation quantity which influences the measurement of the differential pressure is the temperature, since the capacitances $C_1$ and $C_2$ also depend on the temperature in addition to their depending on the differential pressure. In fact, when the temperature is varied the volume of the fluid 20 trapped between the two diaphragms 12 and 13 is also varied. When the volume of the fluid 20 increases as a result of a temperature increase the two diaphragms 12 and 13 are displaced towards the exterior such that the distances between the film electrodes 21 and 22 on the one hand and between the film electrodes 23 and 24 on the other hand increase simultaneously. Correspondingly, the capacitances $C_1$ and $C_2$ decrease simultaneously. Conversely, following a temperature decrease, the two capacitances $C_1$ and $C_2$ increase simultaneously as a result of a decrease of the volume of the fluid. The temperature variation is approximatively proportional to the sum of the reciprocals of the capacitance values:

$$\Delta T = k_T \cdot \left( \frac{1}{C_1} + \frac{1}{C_2} \right) \tag{2}$$

Owing to this fact, it is possible to determine the temperature of the single chamber differential pressure sensor from the measured capacitances $C_1$ and $C_2$ and to use it in order to compensate for the temperature dependence of the differential pressure $\Delta P$. This is ensured by means of the evaluation circuit of the illustrated differential pressure measuring apparatus described hereafter.

The evaluation circuit comprises a first capacitance measuring circuit 41 connected to the terminals 31, 32 for measurement of the capacitance $C_1$, and a second capacitance measuring circuit 42 connected to the terminals 33, 34 for measurement of the capacitance $C_2$. Each capacitance measuring circuit is so designed as to deliver at its output a measurement signal which is proportional to the reciprocal value of the measured capacitance. Thus, the capacitance measuring circuit 41 delivers a measurement signal proportional to $1/C_1$, and the capacitance measuring circuit 42 delivers a measurement signal proportional to $1/C_2$.

The two signals delivered by the capacitance measuring circuits 41 and 42 are supplied to a calculation circuit 43, which calculates the differential pressure $\Delta P$ from these signals. This is illustrated in the drawing by showing that the calculation circuit 43 comprises a subtracting circuit 44, which receives the measurement signals from the two capacitance measuring circuits 41 and 42, and delivers at its output a signal which is proportional to the difference between the reciprocals of the capacitance values: $1/C_1 - 1/C_2$. This signal is supplied to a differential pressure calculator 45.

It is further shown that the calculation circuit 43 comprises a summation circuit 46 which also receives the measurement signals from the two capacitance measuring circuits 41 and 42 and delivers at its output a signal which is proportional to the sum of the reciprocals of the capacitance values: $1/C_1 + 1/C_2$. This signal is supplied to a temperature calculator 47, which calculates therefrom the temperature $T_1$ of the single chamber differential pressure sensor 10. This temperature $T_1$ is also supplied to the differential pressure calculator 45 which takes this temperature into account for calculating a corrected differential pressure $\Delta P$. The differential pressure calculator 45 further takes into account constant correction factors for calculating the differential pressure $\Delta P$, which are ascertained by calibrating the single chamber differential pressure sensor 10 and stored in the calculation circuit 43. These correction factors relate for example to the zero-offset of the measured values resulting from manufacturing tolerances, the sensitivity of the single chamber differential sensor, etc.

The differential pressure ΔP calculated by the differential pressure calculator 45 can be displayed on a differential pressure display 48.

The calculation circuit 43 can be designed in any known convenient manner, for example by means of known analog or digital circuits. Preferably, the calculation circuit is embodied in a suitably programmed microprocessor. If the measurement signals delivered by the capacitance measuring circuits 41 and 42 are not in a format suitable for direct processing in a microprocessor the necessary analog-to-digital converters or other interfaces must be inserted as it is familiar to the man skilled in the art.

The portion of the differential pressure measuring apparatus described heretofore corresponds to the state of the art. The illustrated differential pressure measuring apparatus distinguishes from this state of the art by the features which are described hereafter.

A temperature sensor 50 is mounted on the single chamber differential pressure sensor 10 such that the temperature sensor detects substantially the same temperature as the temperature which is calculated by the temperature calculator 47 from the capacitances $C_1$ and $C_2$ of the two measuring capacitors. The drawing shows that the temperature sensor 50 is mounted onto the outer surface of the base body 11. The temperature sensor 50 can be any known temperature sensor, for example a temperature-dependent resistor of the type PT-100.

A temperature measuring circuit 51 is connected to the temperature sensor 50 and delivers at its output a measurement signal which corresponds to the temperature $T_2$ sensed by the temperature sensor 50. This output signal is applied to a comparison circuit 52 which receives at its other input the output signal from the temperature calculator 47, this output signal indicating the temperature $T_1$ calculated from the capacitance values $C_1$ and $C_2$. The comparison circuit 52 compares the calculated temperature $T_1$ and the measured temperature $T_2$. When there is a difference between these two temperatures and this difference exceeds a predetermined threshold, the comparison circuit 52 delivers a signal which indicates that a cause of failure, leading to an erroneous result, has occurred in the differential pressure measuring apparatus. This signal can for example trigger a failure alarm 53 or can be used in different manners in order to indicate that a failure has occurred and/or to prevent the use of the calculated pressure differential.

In this manner, practically all the components of the differential pressure measuring apparatus can be surveyed to ensure a safe operation thereof, since all perturbations or other causes of failure, which would lead to an erroneous measurement of the capacitances, immediately result in a difference between the calculated temperature $T_1$ and the measured temperature $T_2$. This is notably true for the following sources of failure:

1. oil loss in the single chamber differential pressure sensor 10;
2. defect in one of the capacitance measuring circuits 41 and 42;
3. cable rupture;
4. defect in the temperature sensor 50 or in the temperature measuring circuit 51.

We claim:

1. Differential pressure measuring apparatus comprising a single chamber differential pressure sensor filled with a fluid and having two measuring capacitors whose capacitances vary in opposite senses in response to the differential pressure to be measured and in the same sense in response to the temperature, said capacitances being transformed by means of associated capacitance measuring circuits into measurement signals which are supplied to a calculation circuit for calculating the temperature and the differential pressure, further comprising temperature measuring means for directly measuring the temperature of the single chamber differential pressure sensor and comparison means for comparing the temperature calculated from the capacitances of the measuring capacitors with the measured temperature and for delivering a signal indicating the occurrence of a failure when the difference between the compared temperatures exceeds a predetermined threshold.

2. The differential pressure measuring apparatus of claim 1, wherein the temperature measuring means comprises a temperature sensor mounted on the differential pressure sensor and a temperature measuring circuit connected to the temperature sensor.

* * * * *